United States Patent
Wenzler (10) Patent No.: US 10,402,383 B2
(45) Date of Patent: Sep. 3, 2019

(54) DBMS-SUPPORTED SCORE ASSIGNMENT

(71) Applicant: SAP SE, Walldorf (DE)

(72) Inventor: Rudolf Wenzler, Walldorf (DE)

(73) Assignee: SAP SE, Walldorf (DE)

( * ) Notice: Subject to any disclaimer, the term of this patent is extended or adjusted under 35 U.S.C. 154(b) by 402 days.

(21) Appl. No.: 15/351,779

(22) Filed: Nov. 15, 2016

(65) Prior Publication Data

US 2017/0177633 A1 Jun. 22, 2017

(30) Foreign Application Priority Data

Dec. 18, 2015 (EP) ..................................... 15201174

(51) Int. Cl.
| | | |
|---|---|---|
| G06F 7/00 | (2006.01) | |
| G06F 17/30 | (2006.01) | |
| G06F 16/22 | (2019.01) | |
| G06F 16/2457 | (2019.01) | |
| G06F 16/245 | (2019.01) | |

(52) U.S. Cl.
CPC ........ *G06F 16/221* (2019.01); *G06F 16/2237* (2019.01); *G06F 16/245* (2019.01); *G06F 16/24578* (2019.01)

(58) Field of Classification Search
CPC .. G06F 16/221; G06F 16/2237; G06F 16/245; G06F 16/24578; G06F 16/283; G06Q 20/10; G06Q 30/04; G06Q 20/102
See application file for complete search history.

(56) References Cited

U.S. PATENT DOCUMENTS

| | | | | |
|---|---|---|---|---|
| 2003/0154208 | A1* | 8/2003 | Maimon | ............... G06F 19/324 |
| 2008/0031258 | A1* | 2/2008 | Acharya | ................ H04L 47/10 |
| | | | | 370/395.42 |
| 2015/0088902 | A1* | 3/2015 | Nilsson | ................ G06F 16/245 |
| | | | | 707/745 |

OTHER PUBLICATIONS

Extended European Search Report for European Application No. 15201174.8 dated Jun. 29, 2016.
Guy Harrison et al., "Advanced SQL Tuning, In:MySQL Stored Procedure Programming", Apr. 7, 2006, O'Reilly Media, pp. 486-507.
Stéphane Tufféry, "An application of Data Mining: Scoring In: Data Mining and Statistics for Decision Making", Apr. 18, 2011, Wiley, p. 564.

(Continued)

*Primary Examiner* — Azam M Cheema
(74) *Attorney, Agent, or Firm* — Harness, Dickey & Pierce, P.L.C.

(57) ABSTRACT

A computer-implemented method implemented by a database management system (DBMS). The DBMS includes a database with a data table with a plurality of data columns and a condition table with condition columns and a score column. The DBMS receives a request and extracts a data vector from each data column and a condition vector from each condition column. For each of the data vectors, the DBMS computes a match vector selectively including identifiers of the rows in the condition table whose condition value is identical to an attribute value of said data vector, then, the DBMS selectively returns the rows of the condition table whose respective identifier is contained in each of the computed match vectors as the result to the client application for enabling the client application to identify assignments of the data records and the score values of matching condition table rows.

20 Claims, 4 Drawing Sheets

(56) References Cited

OTHER PUBLICATIONS

Hongjun Lu et al., "Decision Tables: Scalable Classification Exploring RDBMS Capabilities", Proceedings of the 26th International Conference on Very Large Data Bases, Sep. 10, 2000, pp. 373-384.
Tapio Landenmäki el al., "Indexing for Table Joins, I: Relational Database Index Design the Optimizers", Jul. 7, 2005, Wiley-Interscience, pp. 135-184.
Guy Harrison et al., "Basic SQL Training, In: MySQL Stored Procedure Programming", Apr. 4, 006, O'Reilly Media pp. 463-485.

* cited by examiner

Condition-Set-Table T1 — 402

| CA1 | CA2 | CA3 | Score | Score Type |
|---|---|---|---|---|
| 1 | 1 | 1 | 10 | x |
| 2 | 1 | 2 | 15 | x |
| 3 | 2 | 2 | 29 | x |

Fig. 4a

Condition-Set-Table T2 — 404

| CA1 | CA2 | CA4 | Score | Score Type |
|---|---|---|---|---|
| 1 | 1 | A | 7 | y |
| 2 | 2 | B | 14 | y |
| 3 | 1 | C | 21 | y |

Fig. 4b

Condition-Set-Table T3 — 406

| CA1 | CA4 | CA5 | CA6 | Score | Score Type |
|---|---|---|---|---|---|
| 1 | A | 5 | 1 | 15 | z |
| 2 | A | 5 | 1 | 30 | z |
| 3 | B | 6 | 3 | 40 | z |

Fig. 4c

MERGE

Condition Table — 408

| CSet | CA1 | CA2 | CA3 | CA4 | CA5 | CA6 | Score | S.Type | Pattern |
|---|---|---|---|---|---|---|---|---|---|
| 01 | 1 | 1 | 1 | ./. | ./. | ./. | 10 | x | 1\|1\|1\|*\|*\|* |
| 01 | 2 | 1 | 2 | ./. | ./. | ./. | 15 | x | 2\|1\|2\|*\|*\|* |
| 01 | 3 | 2 | 2 | ./. | ./. | ./. | 20 | x | 3\|2\|2\|*\|*\|* |
| 02 | 1 | 1 | ./. | A | ./. | ./. | 7 | y | 1\|1\|*\|A\|*\|* |
| 02 | 2 | 2 | ./. | B | ./. | ./. | 14 | y | 2\|2\|*\|B\|*\|* |
| 02 | 3 | 1 | ./. | C | ./. | ./. | 21 | y | 3\|1\|*\|C\|*\|* |
| 03 | 1 | ./. | ./. | A | 5 | 1 | 15 | z | 1\|*\|*\|A\|5\|1 |
| 03 | 2 | ./. | ./. | B | 5 | 1 | 30 | z | 2\|*\|*\|B\|5\|1 |
| 03 | 3 | ./. | ./. | B | 6 | 3 | 40 | z | 3\|*\|*\|B\|6\|3 |

410 — CSet column; 414 — Score column; 412 — Pattern column

DBMS-SUPPORTED SCORE ASSIGNMENT

FIELD OF THE INVENTION

The invention relates to database management systems, and more particularly to the use of database management systems for efficient score assignment.

BACKGROUND AND RELATED ART

'Big data' is a broad term for data sets so large or complex that specially adapted data processing approaches may be necessary in order to return a processing reside within an acceptable timeframe. For example, databases comprising millions of transactional data records may needs to be processed for identifying correlations and other patterns within the data, for dynamically retrieving specific subsets of the data records and other tasks.

One important aspect of processing large amounts of data, e.g. transactional data, is the assignment of scores. For example, a score can relate to a technical parameter such as total time required by a machine to perform a particular task, the total amount of resources, e.g. energy, chemicals or any other kind of materials consumed for manufacturing a particular good, the price for items ordered by a plurality of customers and the like. Often; said assignment is highly complex, because a large plurality of conditions may have to be checked for dynamically determining which kind of score is to be assigned to a particular data record. For example, the score assignment may be performed for finally calculating an aggregate score from the totality of assigned score values, whereby the question how many and what scores are assigned to a particular data records depends on many different criteria.

For example, the predicted total time a manufacturing line requires for manufacturing a particular good may depend on the type of material and components used for producing said good, may depend on known delivery times of the various suppliers, may depend on the workload of individual machines of the production line which may be used also for producing other types of goods, from a configurable mode of operation of various machines in the production line and the like.

According to another example, the final price assigned to a particular good may depend on customs and taxes, on the customer having ordered the good (there may exist granted discounts), on the chosen way of transportation (by air mail or ship, express or standard delivery time, domestic or international transportation), on the material the good is made of, the size of the good and many other factors.

Management of the plurality of data records representing, for example, machines, production lines, laboratory devices or goods and services on the one hand and scoring data on the other hand has often been difficult in that a direct assignment of said two types of data, e.g. within a single table, is not possible, because the assignments depends on a plurality of criteria (the type of machine, the type of good, the query time, the chosen transport means, etc), which may be provided dynamically and may vary in an unforeseeable manner.

Some approaches for dynamically assigning score values to data records taking account of the plurality of complex conditions are based on retrieving the data records and the scores from a database and then let an application program perform a complex data processing workflow in which the conditions are evaluated and the scores are finally assigned to the data records. However, the retrieval and processing of large amounts of data by an application program often results in a tremendous data traffic between the database server and the computer hosting the application program. Moreover, data processing and application programs is often slow as the processing routines implemented in higher programming languages are not as speed optimized as are the routines of a database management system.

Other approaches for dynamically assigning score values to data records are purely implemented in a database. However, due to the limited set of operations supported by a DBMS, it is often not possible to implement complex assignment strategies which depend on a plurality of different conditions within a DBMS. At least, it is often not possible to provide an efficient implementation of such an assignment as the complexity of the assignment process often exceeds the capabilities of the query planner of the DBMS.

Hybrid approaches for dynamically assigning score values to data records try to provide a compromise by delegating some assignment tasks to the DBMS and others to the application program in order to reduce the complexity of score assignment that still has to be performed in the DBMS. However, said approaches often cause a significant data traffic between the database server and the computer hosting the application program as multiple, often iterative database queries have to be submitted to the DBMS and respective result sets have to be received and processed by the application programs. Moreover, such systems are hard to maintain as the score assignment logic is scattered among the DBMS and the application program.

Hongjun Lu et al.: "Decision Tables: Scalable Classification Exploring DBMS Capabilities", proceedings of the 26th international conference on very large data bases, 10 Sep. 2000, pages 373-384, XP055280742, Cairo, Egypt, ISBN: 978-1-55860-715-6 describes an approach in building efficient scalable classifiers in the form of decision tables by exploring capabilities of modern relational database management systems. In chapter 3.2.4, the pruning of the decision table is mentioned.

SUMMARY

It is an objective of the present invention to provide for an improved system, method and computer program product for returning a result set that allows an assignment scores to data records as specified in the independent claims. Embodiments of the invention are given in the dependent claims. Embodiments of the present invention can be freely combined with each other if they are not mutually exclusive.

A "database management system" (DBMSs) is a specially designed software and/or hardware based application that is designed to al-low the definition, creation, querying, updating and administration of one or more databases. Typically, a DBMS is operable to interact with a user, with other applications, and one or more databases managed by the DBMS to process some requests and to analyze data. A DBMS may allow the definition, creation, querying, update, and administration of databases. Well-known DBMSs include MySQL, MariaDB, PostgreSQL, SQLite, Microsoft SQL Server, Microsoft Access, Oracle, SAP HANA, dBASE, FoxPro, IBM DB2, and others.

A "database" as used herein is a collection of electronic information that is organized in memory or on a non-volatile storage volume in the form of a particular, defined data structure which supports or is optimized for data retrieval by a particular type of database query. A database may be organized in tables or columns or other forms of data structures to provide efficient retrieval. In conventional databases, all tables of the database have the same structure in respect to the physical organization of the data in the memory or on a non-volatile storage medium. For example, some row-oriented databases may comprise multiple tables which organize their data in a row-oriented manner. Some column-oriented databases may solely comprise tables which organize their data in a column-oriented manner. In said cases, the database and all its tables may structurally be optimized for a particular type of database query. There exist also some DBMS which store data redundantly in different data structures that support different kinds of database queries. For example, some DBMS, when storing some data in a row-oriented manner, automatically create a copy of said data and store the copy in a column-oriented manner. According to some embodiments, the DBMS hides the two different data structures comprising the two data copies and being optimized for different kinds of database queries from the user and merely presents one copy, e.g. the row-oriented copy of the data, to a client.

A "condition" or "condition type" as used herein is a logical criterion that is designed for being evaluated against a respective attribute value of a data record for determining if said data record fulfils said criterion or not.

A "condition value" as used herein is a data value of a particular condition. If a respective attribute value of a data record is identical to said condition value, said data record is considered as fulfilling said condition. For example, the condition "transportation" may have two possible condition values "domestic transport" and "international transport". A data record fulfils the condition "transportation=domestic transport" only and specifically in case it comprises a corresponding attribute "transport" whose data value is identical to "domestic transport". Condition values may be integers, Strings, floats, data sets or other types of data values.

A "condition type set" as used herein is a set of two or more condition types which relate to a common type of score. For example, the score type "material price" may depend on the material of the ordered item, but optionally may also depend on the amount of material ordered (quantity discount), the customer (customer-specific discounts for specific materials) and other factors relating to the material price. The score type "tax" may depend on the country-specific import tax of the country to which an ordered item shall be shipped. It may also depend on other factors, e.g. small entity or large entity status of the selling company, the legal form of the selling company etc. Depending on the embodiment, the condition table is derived from two or more condition type sets which may be disjoined or may be at least partially overlapping.

A "data record" as used herein is a data item that represents a tuple (of data attributes according to some metadata.

A "vector" as used herein is a data structure comprising a set of data values of the same basic type. Preferentially, a vector according to embodiments of the invention merely comprises unique data values, i.e., the vector does not comprise two instances of the same data value.

A "score" as used herein is a numerical value that indicates a property of a data record either in absolute or in relative terms.

A "column store" as used herein is a database table whose columnar data is stored using a column data format. Instead of having the table composed of rows sharing the same schema, in a column store one has columns treated like entities independent from rows. Columns are related to one another by some primary-key value. In some DBMSs, a columnar storage is automatically created by the DBMS for the data in each column of a database table by creating an ad hoc index on the columns of regular tables.

In one aspect, the invention relates to a method for returning, in response to a request of a client application to a DBMS, a result. The DBMS comprises a database. The database comprises a data table and a condition table. The data table comprises a plurality of data records and comprises a plurality of data columns. Each data column represents an attribute. The condition table comprises condition columns and a score column. Each condition column is assigned to one of the data columns and comprises condition values. Each row in the condition table comprises one score value. The method comprises:

receiving, by the DBMS, the request;
  automatically extracting, by the DBMS, from each of the data columns, a respective data vector,
  automatically extracting, by the DBMS, from each of the condition columns, a respective condition vector,
  for each of the data vectors, computing, by the DBMS, a match vector, the computation of the match vector comprising computing an intersection of said data vector and the one of the condition vectors having been extracted from the condition column assigned to the data column used for extracting said data vector, the match vector selectively comprising identifiers of the rows in the condition table whose condition value is identical to an attribute value of said data vector;
  selectively returning, by the DBMS, the rows of the condition table whose respective identifier is contained in each of the computed match vectors as the result to the client application.

Said features may be advantageous for the following reasons:

The extraction of the condition vectors and of the data vectors and the computation of the match vectors by computing an intersection of the data vectors and condition vectors can be implemented in a database highly efficiently. For example, in some embodiments, the condition vector and/or the data vector may already be generated by the DBMS automatically by means of a dictionary encoding process. But even in case the extraction of the data vector and of the condition vector is explicitly performed in response to the request, the extraction of a unique value set from the values of a column can typically performed very efficiently in current DBMSs. Moreover, the extraction of unique value vectors from a database table can be executed in parallel on multiple processors or cores with only a very small computational overhead (compared to the computational overhead when, for example, parallelizing individual SELECT statements).

Also, the computation of the match vectors can be performed highly efficiently by the limited set of operations supported by current DBMSs. For example, a match vector can highly efficiently computed by an SQL command like "SELECT C3 from condition_table INTERSECT SELECT A3 from data_table".

By computing the match values for all condition columns and respectively assigned data columns, a set of match vectors is provided that can be computed very quickly and that represents an intermediate result which tremendously reduces the potential solution space. The original solution space of the score assignment task can be considered as the product #DTR×#CTR, wherein #DTR is the number of rows of the data table requested by the request (i.e., the number of requested data records) and wherein #CTR is the number of rows of the condition table. So for 1.000.000 data records and 90 different condition table rows (respectively corresponding to a particular score value that is to be assigned to any data record whose attribute values match all condition values of a condition table row), the initial solution space would be 90.000.000. The original space is even more complex as the actual assignment of scores and data records depends on a plurality of conditions that have to be matched against attribute values. Depending on the variability of attribute values in each of the data columns, for each data column a data vector of e.g. several thousand, or several hundred or even only a few unique attribute values may be extracted. Depending on the variability of condition values in each of the condition columns, for each condition column a condition vector of e.g. 90, or 50 or even only a few unique condition values may be extracted from the exemplary 90-row condition table. Each match vector selectively comprises identifiers of the rows in the condition table whose condition value is identical to an attribute value of the respective data vector (a "respective data vector" of a condition vector is a data vector extracted from a data column to which the condition column from which said condition vector was extracted is assigned). Thus, each match value in the above mentioned example comprises 1-90 distinct condition values. The set of match vectors, together with the requested data records, allows a client to very efficiently assign scores to data rows whose attribute values match all conditions of a condition row. This can be done by identifying, for each data record, one or more rows of the condition table whose condition values all match a respective attribute value of said data record. This identification step is not performed on the original condition table but rather is performed on a subset of the rows of the condition tables identified via the match vectors, said sub-set of rows being returned to the client application. The result returned to the client application is not as such an assignment of scores to matching data records, but it represents a solution space of significantly reduced size that enables a client to assign one or more scores (contained in respective condition table lines) to each data record without additional roundtrips to the database.

In effect, a DBMS according to embodiments of the invention may be capable of returning, in response to a database request, in a very efficient manner, a result (a subset of condition table rows identified via the match vectors and optionally also the requested data records) to the requesting client application. Said result enables the client application to efficiently perform a last step of score assignment without additional calls to the database, thereby reducing not saving CPU power at the side of the DBMS as well as at the side of the client system, but also significantly reducing network traffic and the total time needed to perform the score assignment.

According to embodiments, the client application performs the identification of the assignments of the plurality of data records to the one or more score values contained in the condition tables by performing, for each of the data records:
a) for each row of the result, checking if all condition column cells of said row comprise a condition value or default value that is identical to a corresponding attribute value of the data record; and
b) only in case said checking returns TRUE for a row in the result, assigning the score value of said row of the result to said data record.

The returned condition table rows having been identified via the match vectors may comprise rows whose condition values do not all match respective attribute values of at least one data record. Nevertheless, the sub-set of condition table rows returned to the client application may significantly reduce the possible solution space.

According to embodiments, the method further comprises:
c) computing, by the client application for each of the plurality of data records, an aggregated score value from all score values having been assigned to said data record in b); and
d) assigning the aggregated score value to the data record.

For example, the individual scores in each condition table row may represent only a fragment of a final score value and may be, for example, represented as a percentage value or in absolute numbers.

According to one example, costs for domestic transportation are assigned as a "first score value" to a particular data record in case the attribute "transport" of said data record having the value "domestic transportation" was found to match with the condition value "domestic transportation" in a condition column "transport" in a first one of the returned condition table rows (provided all other condition values of said condition table row also match to respective attribute values). Costs for taxes in France are assigned as a "second score value" to said particular data record in case the attribute "tax-raising country" of said data record having the value "France" was found to match with the condition value "France" in a condition column "tax-raising country" of said condition table row (provided all other condition values of said condition table row also match to respective attribute values). A customer-specific discount is assigned as a "third score value" to said particular data record in case the attribute "customer" of said data record having the value "company-XYZ" was found to match with the condition value "company-XYZ" in a condition column "customer" of said condition table row (provided all other condition values of said condition table row also match to respective attribute values). At the end, a final score, e.g. the end price of a product, is computed as an aggregate of the first, second and third score values assigned to the data record representing said product is computed. Said end price may depend on hundreds of conditions, not only on three conditions as in this example.

As the score assignment in step b) may be performed highly efficiently by the application program, also the computation of the final score value being an aggregate of multiple score values assigned to a particular data record can typically be performed very quickly.

According to embodiments, the request is configured to trigger the DBMS to provide information indicative of an assignment of a plurality of data records to one or more respective score values. Said assignment may depend on a plurality of conditions that have to be met by respective attribute values of each of the data records. Thus, the request may relate to a particular type of complex data extraction request involving the evaluation of a plurality of conditions on respective data records.

According to embodiments, each row in the condition table selectively comprises condition values of the condition types belonging to one of the condition type sets and comprises a default value in all condition columns not belonging to said one condition type set. The default value can be, for example, a NULL value. The condition types represented by the condition columns form two or more completely or at least partially disjoint condition type sets.

According to embodiments, each data record represents a data object of a data object type. The columns of the data table represent an attribute of said data object type. Each of the condition values is a data value that is to be compared with the attribute values in the one of the data columns said condition column is assigned to. Each condition column represents a condition type. Each data vector comprises a list of all unique attribute values contained in said data column and comprises a default value. Each condition vector comprises all unique condition values contained in the condition column and comprises the default value. The result is returned to the client application for enabling the client application to identify assignments of the data records and the score values in the condition table by processing the result.

According to embodiments, the result (and, according to some embodiments, also the condition table) comprises a pattern column. The method further comprises:

computing, e.g. by the stored procedure of the DBMS or another part or module of the DBMS, for each row of the condition table, a first code value. The first code value comprises as many code positions as there exist condition columns in the condition table and comprises, at each of its positions, the condition value of the respective condition column of said row or a derivative of said condition value. The derivative may be, for example, a hash value or a chunked version or a toLowerCaseString version of the original condition value or any other kind of derivative data value that may preferentially reduce the size of the original value but still is a unique identifier of said original condition value; and storing the first code value of each row of the condition table in a respective cell of the pattern column.

For example, the pattern column may be part of the condition table, and a database-internal function may automatically compute a first code value upon storing or updating a row in the condition column. Upon returning the identified condition table rows, also the first code values in the pattern table are returned.

Alternatively, a stored procedure may dynamically, in response to the request, compute the first score values for each of the condition table rows to be returned to the client application as the result, whereby each of the returned condition table rows are supplemented with the dynamically computed first code values.

Computing the first score values may allow, in combination with the computation of second score values by the client application, the client application to identify the ones of the returned condition table rows whose condition values are all fulfilled by a respective attribute value of a data record (e.g. are identical to said respective attribute value) very quickly. By using derivative data values, e.g. hash-values, the size of the first code values and thus also the data traffic between the DBMS and the client application can be reduced.

According to embodiments, the client application computes, for each of the plurality of data records, a second code value. The second code value comprises as many code positions as there exist condition columns in the condition table and comprises, at each of its positions, the attribute value of one data column of said data record or a derivative of said attribute value, the one data column being the one data column to which the condition column to which said position corresponds is assigned. The client application performs the checking by determining if the second code value of said data record matches with (e.g., is identical with) the first code value of each of said identified rows in the condition table, whereby a second code matches with a first code value in case for each code position of the first code value the following criteria are fulfilled:

i) the second code comprises, at said code position, the same data value at the first code value at said code position; or ii) the code position of the first code value comprises the default value. Thus, a default value in the condition column and the default value or its derivative at a corresponding position in the first code acts as a kind of regular-expression matching any possible kind of data value at a respective position in the second code.

According to embodiments, the DBMS is hosted on a multi-processor computer system. The operations of the method according to any one of the embodiments described herein are performed by the DBMS on multiple processors. The extraction of the data vectors from each of the data columns is performed for the different data vectors in parallel.

According to embodiments, the DBMS is hosted on a multi-processor computer system. The operations of the method according to any one of the embodiments described herein are performed by the DBMS on multiple processors. The extraction of the condition vectors from each of the condition columns are performed for the different condition vectors in parallel.

Column-based parallelization may significantly increase performance. Compared to parallel execution of complex SELECT queries which try to evaluate a plurality of conditions and respective tables for assigning score values and data records in a database, parallel execution of column-wise vector extraction and vector intersection computation is significantly faster. In case said complex SELECT statements are performed for each data record to which a score value shall be assigned, millions of SELECT queries accessing a plurality of tables may need to be parallelized. This requires much more computational overhead than a column-based parallelization and may not always be feasible if a large number of tables are accessed. The extraction of unique value vectors and the computation of an intersection of two unique value vectors do not require access to any further columns or tables and thus can easily be parallelized.

According to embodiments, the condition vectors and/or the data vectors and/or the match vectors respectively are stored in a column store data format. For example, a stored procedure may be called by the request and may extract the data vectors and optionally also the condition vectors and may compute the match vectors in response to being called. Then, the stored procedure may store the extracted and computed vectors in a column store format. Storing the vectors in a column store data format may be advantageous as the computation of an intersection of two data value vectors respectively being stored in a columnar data structure may be accelerated.

Using a column store may be advantageous as data in a column store are already vertically partitioned, so operations on different columns can readily be processed in parallel. If multiple columns need to be searched or integrated, each of these operations can be assigned to a different processor core. In addition, operations on one column can be parallelized by partitioning the column into multiple sections that are processed by different processor cores. Moreover, column data is typically of uniform type which can facilitate opportunities for storage size optimizations available in column-based data stores that are not available in row-based data stores.

According to some embodiments, the condition vectors and/or the data vectors are respectively created by a column store module of the DBMS. For example, the condition vectors and/or the data vectors are respectively created by an automatically executed dictionary encoding process of the DBMS. This may be advantageous as DBMS-internal routines such as dictionary encoding are typically implemented such that said task is performed very efficiently. Moreover, the condition vector and optionally also the data vector may already exist in a dictionary of the respective data or condition table at the moment when the DBMS receives the request. Thus, the time required until the result is returned can further be reduced. Some DBMSs, e.g. SAP Hana, already support the automated generation of unique value vectors by a dictionary encoding process upon creating or modifying a database table.

According to some embodiments, the condition vectors are created automatically upon creating or updating the condition table in the database.

According to some embodiments, the client application is an application hosted on a client device operatively coupled to the DBMS via a network, e.g. the internet or an intranet.

According to other embodiments, the client application is an application program running on the same computer system as the DBMS. According to some of said embodiments, the client application is a plug-in of the DBMS, e.g. a program logic module loaded to the DBMS after the DBMS was installed or instantiated.

According to embodiments, the DBMS uses the condition table instead of a plurality of condition-set-tables for increasing the performance of the score computation. Each condition-set-table comprises a set of condition columns and represents a set of condition types. The set of condition types is completely or partially disjoint from the sets of condition types represented by condition columns of other ones of the condition-set-tables. Each condition-set-table comprises a score column. Using the condition table instead of a plurality of condition-set-tables may be performed e.g. by replacing, in the database, a plurality of condition-set-tables by the condition table or by supplementing the database with the condition table, whereby the condition table is created by unifying the content of the condition table. The unification comprises filling, in each row of the unified condition table, each cell belonging to a condition column whose condition type is not contained in the condition type set from which the condition values of said row were derived with a default value, e.g. a NULL value. According to preferred embodiments, the score values to be assigned to the data records are all stored in a single condition table.

Said features are advantageous as the complexity of the SQL queries previously required for evaluating the conditions for performing score assignment is reduced: only a single rather than many tables comprising score and condition information is accessed. Moreover, in case the match vector computation would be performed for multiple condition-set-tables comprising overlapping condition type sets separately, the total memory consumption would increase, because the unique condition value vectors would comprise the condition values of a condition type shared in many condition-set-table multiple times, thereby increasing the total size of the generated condition vectors.

According to embodiments, the method comprises creating the condition table from the plurality of condition-set-tables. The creation may be performed manually, automatically, e.g. by a database script or a stored procedure, or semi-automatically. The creation of the condition table comprises:

Identifying a non-redundant set of all condition types represented by all condition columns of all condition-set-tables in the database;

Creating the condition table as a table comprising, for each of the identified condition types, a respective condition column, the condition table further comprising a score column;

For each of the condition-set-tables: copying each row of said condition-set-table to a respective row in the condition table, whereby cells in the condition table belonging to condition columns not corresponding to a respective condition column in said condition-set-table are filled with the default value and whereby the cell in the condition table belonging to the score column is filled with the score value of said row in said condition-set-table.

According to embodiments, the creation further comprising adding a further column to the condition table comprising an index or a key pointing to the original condition-set-table.

According to embodiments, using the condition table instead of the plurality of condition-set-tables comprises replacing, by the DBMS in the database, a plurality of condition-set-tables by the condition table. Alternatively, the using of the condition table instead of the plurality of condition-set-tables comprises supplementing, by the DBMS, the database comprising a plurality of condition-set-tables with the condition table.

In addition or alternatively, the DBMS according to embodiments of the invention executes a stored procedure instead of iteratively, in two or more nested score computation loops, accessing a condition-set-table access for identifying a score value to be assigned to a particular data record. The stored procedure is configured to compute the data vectors and the result in a single condition table access operation.

According to embodiments, the default value is a NULL value. This may be advantageous as the total memory consumption of the condition table and the network traffic for returning the result is reduced.

According to embodiments, the DBMS runs on a computer system coupled to a client system via a network connection. The request is submitted by an application program running on the client system via the network to the DBMS. The data records and their assigned score values are returned to the client system via the network.

According to embodiments, the extraction of the data vectors, the computation of the match vectors and the returning the result and optionally also the extraction of the condition vectors are implemented in a stored procedure stored in the database which is invoked upon the DBMS receiving the request. According to some embodiments, also the computation of the first code values is implemented in said stored procedure or in another stored procedure in the DBMS. Said stored procedure or said other stored procedure are stored in the database and are invoked upon the DBMS receiving the request.

Using a stored procedure may be advantageous, because by supplementing a database by a (unified) condition table and a stored procedure that is configured to extract the data vectors, to compute the match vectors and to return condition table rows identified via the match vectors may allow for an accelerated retrieval of data for efficient score assignment without significantly changing the overall structure of the database.

In a further aspect, the invention relates to a computer-readable storage medium comprising computer-interpretable instructions which, when executed by one or more processors of a computer system cause the computer system, alone or in interaction with a client device, to perform a method according to any one of the embodiments described herein.

In a further aspect, the invention relates to a computer system comprising a server system. The server system comprises one or more processors, main memory and a DBMS comprising a database. The DBMS being configured for returning, in response to a request of a client application to a DBMS, a result. The database comprises a data table and a condition table. The data table comprises a plurality of data records and comprises a plurality of data columns respectively representing an attribute. The condition table comprises condition columns and a score column. Each condition column is assigned to one of the data columns and comprises condition values. Each row in the condition table comprises one score value.

The DBMS being configured for:
receiving the request of the client application;
automatically extracting, from each of the data columns, a respective data vector;
automatically extracting, from each of the condition columns, a respective condition vector;
for each of the data vectors, computing a match vector, the computation of the match vector comprising computing an intersection of said data vector and the one of the condition vectors having been extracted from the condition column assigned to the data column used for extracting said data vector, the match vector selectively comprising identifiers of the rows in the condition table whose condition value is identical to an attribute value of said data vector;
selectively returning the rows of the condition table whose respective identifier is contained in each of the computed match vectors as the result to the client application.

According to embodiments, the computer system further comprises a client device. The client device hosts the client application and is operatively coupled to the server computer via a network.

The client application is configured for identifying the assignments of the plurality of data records to the one or more score values contained in the condition tables by performing, for each of the data records:
a) for each row of the result, checking if all condition column cells of said row comprise a condition value or default value that is identical to a corresponding attribute value of the data record;
b) only in case said checking returns TRUE for a row in the result, assigning the score value of said row of the result to said data record.

According to embodiments, the client device is a mobile, battery-powered telecommunication device.

According to embodiments, the client application is configured for identifying the assignments of the plurality of data records to the one or more score values contained in the condition tables by performing, for each of the data records:
a) for each row of the result, checking if all condition column cells of said row comprise a condition value or default value that is identical to a corresponding attribute value of the data record;
b) only in case said checking returns TRUE for a row in the result, assigning the score value of said row of the result to said data record.

BRIEF DESCRIPTION OF THE DRAWINGS

In the following embodiments of the invention are explained in greater detail, by way of example only, making reference to the drawings in which.

Figure 1:
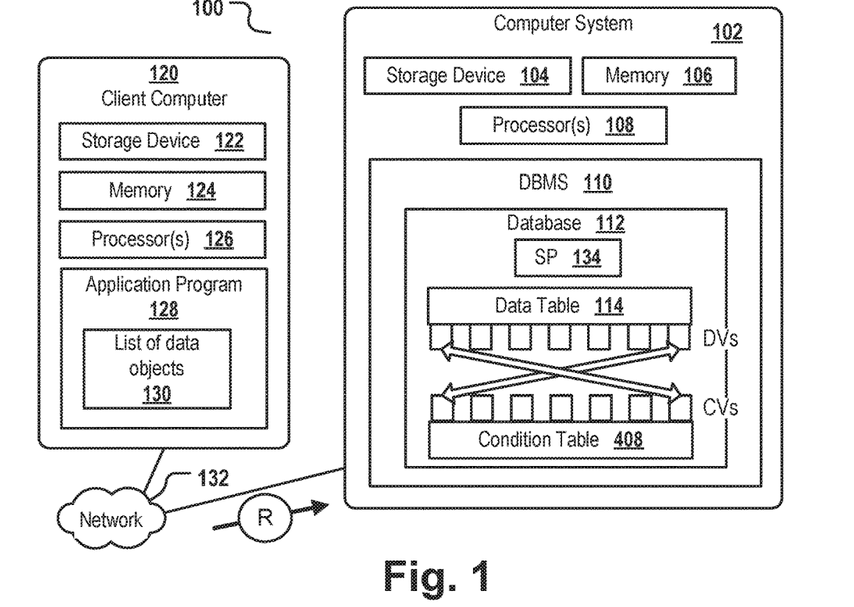
FIG. 1 depicts a database server and a client computer.
Figure 3:
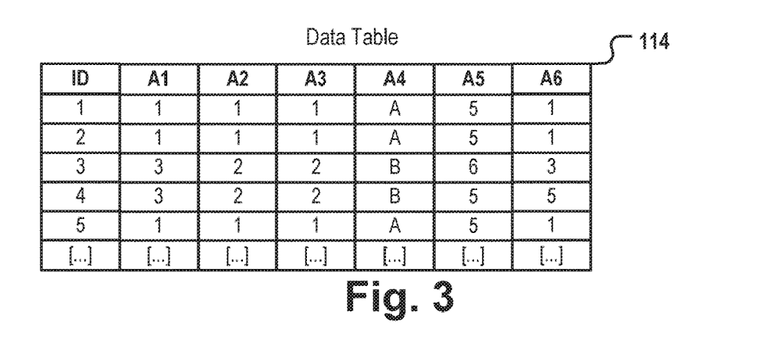
FIG. 3 depicts a data table.
Figure 4A:
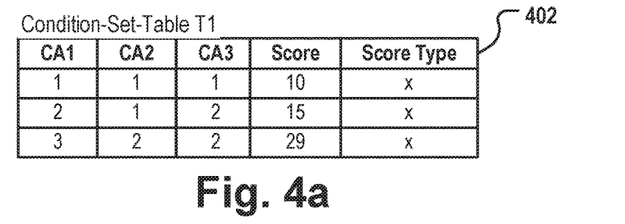
FIG. 4a depicts a first condition-set-table.
Figure 4B:
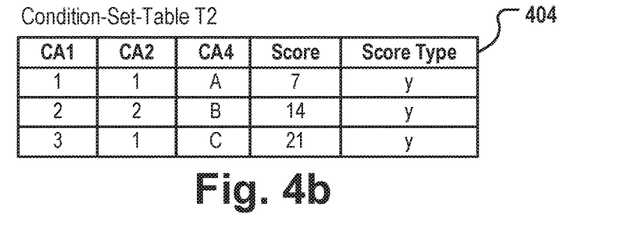
FIG. 4b depicts a second condition-set-table.
Figure 4C:
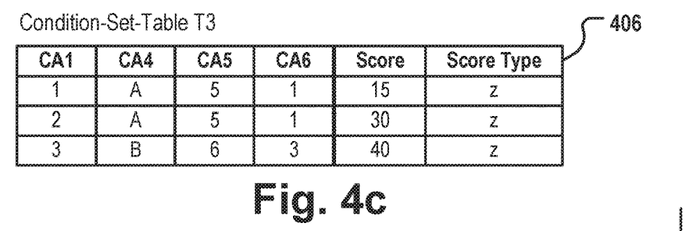
FIG. 4c depicts a third condition-set-table.
Figure 4D:
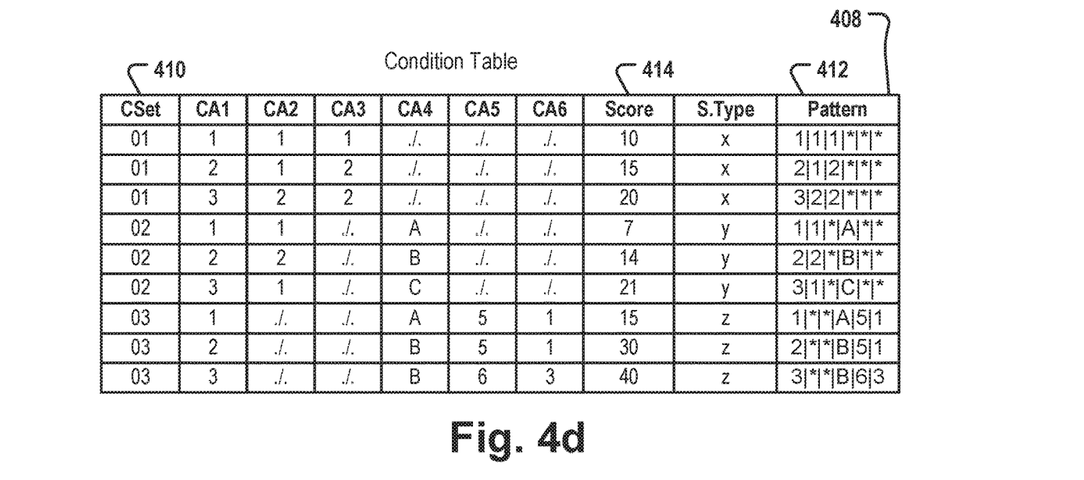
FIG. 4d depicts a condition table created by unifying tables 4a-4c.

FIG. 1 depicts a computer system 100 comprising a database server 102 and a client computer 120. The database server comprises a storage device 104, a main memory 106 and one or more processors 108. Preferentially, the database server comprises a plurality of processors 108 supporting parallel execution of different software threads. The database server hosts a DBMS 110, e.g. SAP Hana. The DBMS manages at least one database 112 which comprises a data table 114 with a plurality of data records (an example of a data table is shown in FIG. 3) and comprises one condition table 408 (an example of a condition table is shown in FIG. 4d). In addition, the database comprises a stored procedure 134 that can be called by a client application 128 running on a client computer system 120.

The client computer may comprise a storage device 122, a memory 124 and one or more processors 126. The client computer may be, for example, as a mobile, battery-powered telecommunication device, e.g. a notebook, a tablet computer or a smart phone. The client computer hosts a client application program 128 which is configured to maintain a list of data objects 130. The client computer is connected to the database server 102 via a network 132, e.g. the Internet. In other embodiments, the client program 128 and the DBMS may run on the same machine.

Figure 2:
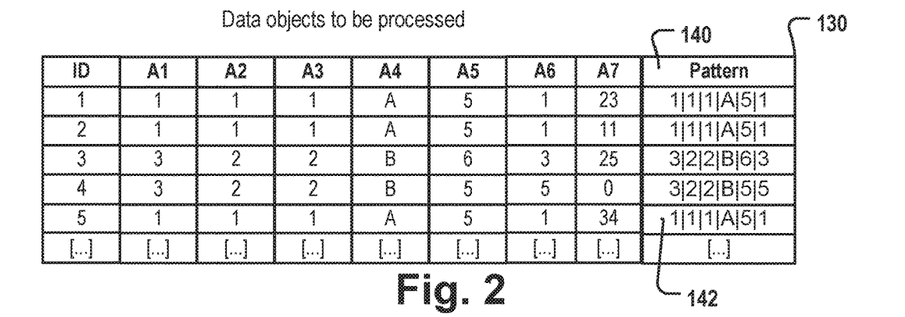
FIG. 2 depicts data objects maintained by a client application program.

FIG. 2 depicts data objects maintained by a client application program. A user of the application program 128 may wish to quickly assign one or more score values contained in the condition table 408 to each of the data objects 130 for computing a final, aggregated score value for each data object. Each of the data objects 130 may correspond to a respective data record in the data table 114. For example, the data objects 130 may be class instances of an application program written in Java, ABAP or another programming language which have being created from attribute values of respective data records in the data table 408, whereby each line of the data table constitutes a data record and corresponds to a respective one of the data records 130. Alternatively, the data records 130 may also be stored in tabular form as depicted in FIG. 2. Depending on the embodiment, the data objects 130 may already be created by the application program 128 before said program submits a request R to the DBMS. Alternatively, data records of interest may be identified by the DBMS in response to the request and returned to the client application program (e.g. together with the returned result), where the returned data objects may be stored in a client-side database and/or may be represented as a set of data objects. In some embodiments the set of data objects 130 comprises more attributes (e.g. attribute A7) than the data table 408, because additional attribute values may be derived from other tables of the DBMS or from another data source upon instantiating the data objects 130.

According to embodiments, each data object comprises a "pattern" attribute or column 140 comprising code values, also referred to as "second code values". Each position of a second code value corresponds to one of the data columns A1-A6 of the data table and indicates the attribute value (or default value) stored in respective cells of a data table row for which said second code value was computed. For example, the second code value 142 has 6 positions, one position for each of the data columns A1-A6. The attribute values of the attributes A1-A6 comprise the values "1", "1", "1", "A" and "5". Correspondingly, the second code value comprises the concatenated value "1|1|1|A|5|1". The concatenated value may comprise a delimiter symbol, e.g. a pipe symbol "|". In SQL, the concatenation may be implemented as:
UPDATE conditiontable set pattern=
case when CA1 is null then './.' else CA1 end ||'|'||
case when CA2 is null then './.' else CA2 end ||'|'||
case when CA3 is null then './.' else CA3 end ||'|'||
case when CA4 is null then './.' else CA4 end ||'|'||
case when CA5 is null then './.' else CA5 end ||'|'||
case when CA6 is null then './.' else CA6 end ||'|'||;

FIG. 3 depicts a data table 114 comprising a plurality of data records, i.e., rows comprising attribute values of a data object in accordance with a predefined data model; also referred to as a "data object type". The data table comprises a plurality of data columns A1-A6. For example, a data object type may be "order item" having attributes and respective data columns such as A1: product-type, A2: customer, A3: transportation A4: tax-raising-country, A5: material, A6: order date. The individual cells of the data table attribute values and may optionally comprise in some cells in some embodiments a default value, e.g. a NULL value.

FIG. 4d depicts a condition table. Depending on the embodiment, the condition table may be created de novo by a database developer or system architect or may be created by unifying a plurality of existing condition-set-tables such as depicted in FIGS. 4a-4c.

The condition table comprises a plurality of condition columns CA1-CA6. Each condition column is assigned to a respective data column of the data table and represents a condition type. The assignment to a respective one of the data columns typically implies that the condition column has the same data type as the data column to which it is assigned. In addition, the assignment implies that the condition values of a condition column shall be compared with attribute values in the data column of a respective one of the data columns. Thus, each condition column comprises condition values which have to match an attribute value in the assigned data column for considering the condition represented by said condition column as being met by said attribute value. For example, the condition type column CA3 may represent the condition type "transportation". There may exist only two distinct condition values for the condition type "transportation", e.g. "1" representing domestic transportation and "2" representing international transportation. A particular condition value "1" contained in a cell in condition column CA3 will be considered to match an attribute value in a cell in a data column A3 only in case the attribute value is also "1", implying that the order item represented by a particular data record shall be transported via domestic transportation. A "match" of a condition value and an attribute value typically implies that the condition value and the attribute value are identical.

The condition table comprises a score column 414. The condition values and the content of the score column are chosen such that in case all the condition values of a particular condition table row match with a respective attribute value of a data record in the data table, the score value contained in said condition table row will be selectively assigned, by embodiments of the invention, to said data record or to a plurality of data records respectively matching all condition values of said row. If there exists a single condition value in the condition table row that does not match the respective attribute value, the score value shall not be assigned to said data record. The condition table may comprise further columns, e.g. a column "Score Type" or "S.Type" being indicative of the unit of the respective score (e.g. a particular currency unit, a temperature unit, a length measuring unit, [%] unit or the like) or a column for a more complex formula. For example, the formula may indicate how attribute values of a data record to which the score value of a particular condition table row is successfully assigned shall be processed for dynamically refining the assigned score value. The formula may specify if a score value is an absolute number that has to be added during the calculation of a final aggregate score value to other score values or if the score value is a relative score value, e.g. a %-value, that needs to be multiplied with another score value for computing a final aggregate score value.

The condition types (e.g. CA1: product-type, CA2: customer, CA3: transportation CA4: tax-raising-country, CA5: material, CA6: order-date) represented by the condition columns for two or more completely or at least partially disjoint condition type sets. In the condition table example depicted in FIG. 4d, there is a first condition type set {CA1, CA2, CA3}, a second condition type set {CA1, CA2, CA4} and a third condition type set {CA1, CA4, CA5, CA6}. Each row in the condition table selectively comprises condition values of the condition types which belong to one of the condition type sets and comprises a particular default value in all condition columns which do not belong to said one condition type set. For example, the first three rows of the condition table 408 belong to the first condition set depicted in FIG. 4a. Rows 4-6 of the condition table belong to the second condition set depicted in FIG. 4b. Rows 7-9 of the condition table belong to the third condition set depicted in FIG. 4c. In some embodiments, condition type set to which a particular row belongs is indicated by a value in a condition type set column 410.

The default value, indicated in the depicted example as "./.", is preferentially a NULL value. The default value is the same for all the rows of the condition table irrespective of its membership to a particular condition type set.

According to embodiments, the condition table 408 is created by unifying (or "merging") condition values and respective scores of a plurality of condition-set-tables such as depicted, for example, in FIGS. 4a-4c. It is possible that two or more condition-set-tables comprise the same condition column (column CA1 in condition-set-tables 402, 404 and 406; column CA2 in condition-set-tables 402 and 404). However, the resulting condition table 408 comprises only a single column CA1 for each condition type, because a duplication of shared condition columns/condition types is prohibited. The condition table comprises as many condition columns as there exist unique condition types in any of the condition set tables and corresponding condition type sets to be unified. Empty cells are filled with the default value.

In addition, according to embodiments of the invention, the condition table comprises a pattern column 412. Each condition table row comprises a first code value in the pattern column, whereby each position in the first code value is indicative of the data value (a particular condition value or the default value) contained in a cell of said row in a respective condition column.

According to embodiments, the first code values are computed and stored in the pattern column by a stored procedure 134 in response to receiving a request R of a client application for all constitution table rows. Alternatively, the first code values can also be computed by a database procedure that is triggered by creating, inserting or modifying a respective row in the condition table. In still other embodiments the condition table lacks a pattern column. In this case, the first code values may selectively be computed for condition table row is to be returned as a result in response to a request of a client application.

By unifying a plurality of condition set tables 402-406 into a single condition table 408, it is possible to avoid multiple request-response cycles between a client application and the DBMS in order to assign score values of the individual condition set tables to a set of data records. By computing first and second code values, it is further possible to quickly identify condition table rows and respective scores which match the attribute values of a particular data record without performing multiple iterative roundtrips and requests to the database.

Figure 5A:
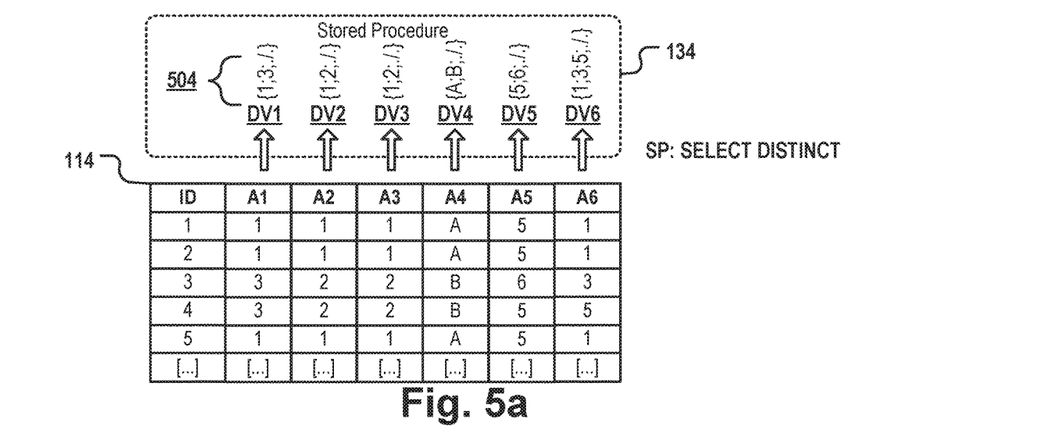
FIG. 5a depicts the extraction of data vectors from respective data columns.
Figure 5B:
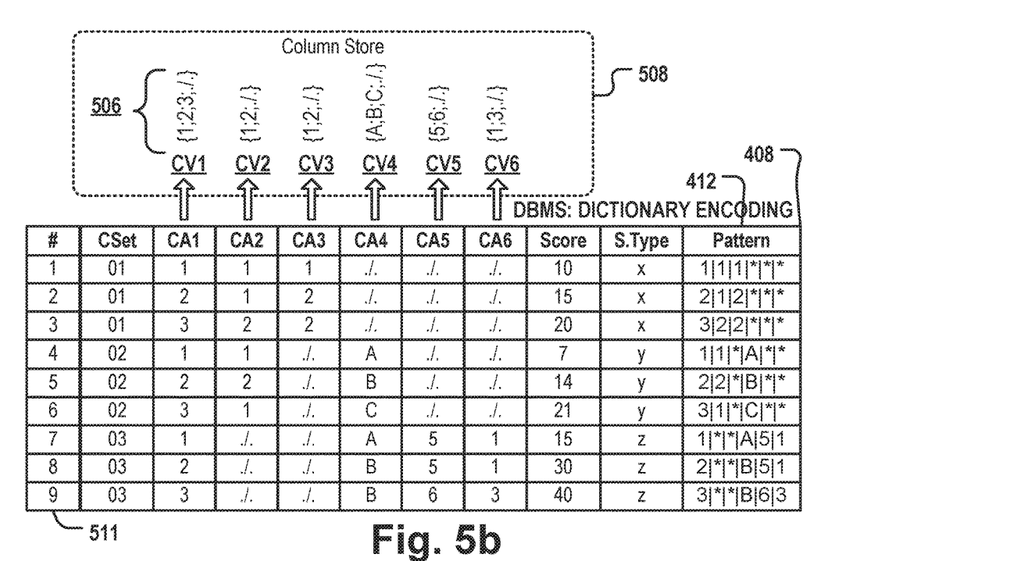
FIG. 5b depicts the extraction of condition vectors from respective condition columns.
Figure 5C:
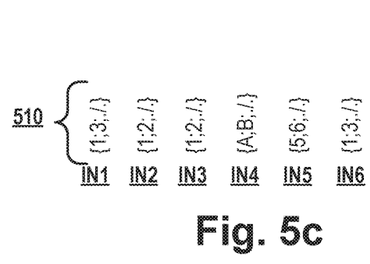
FIG. 5c depicts attribute value sets created by intersecting the data vectors with respective condition vectors.
Figure 5D:
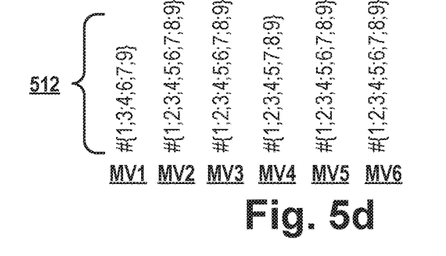
FIG. 5d depicts match vectors respectively comprising IDs of condition table rows whose condition values are all contained in a respective intersection set of FIG. 5c.

FIG. 5a depicts the extraction of data vectors from respective data columns. FIGS. 5b-d show further vectors and intermediate results computed in order to compute the match vectors of FIG. 5d. The computation of the vectors will be described in the following by making reference to the flow chart of the method depicted in FIG. 7.

Figure 7:
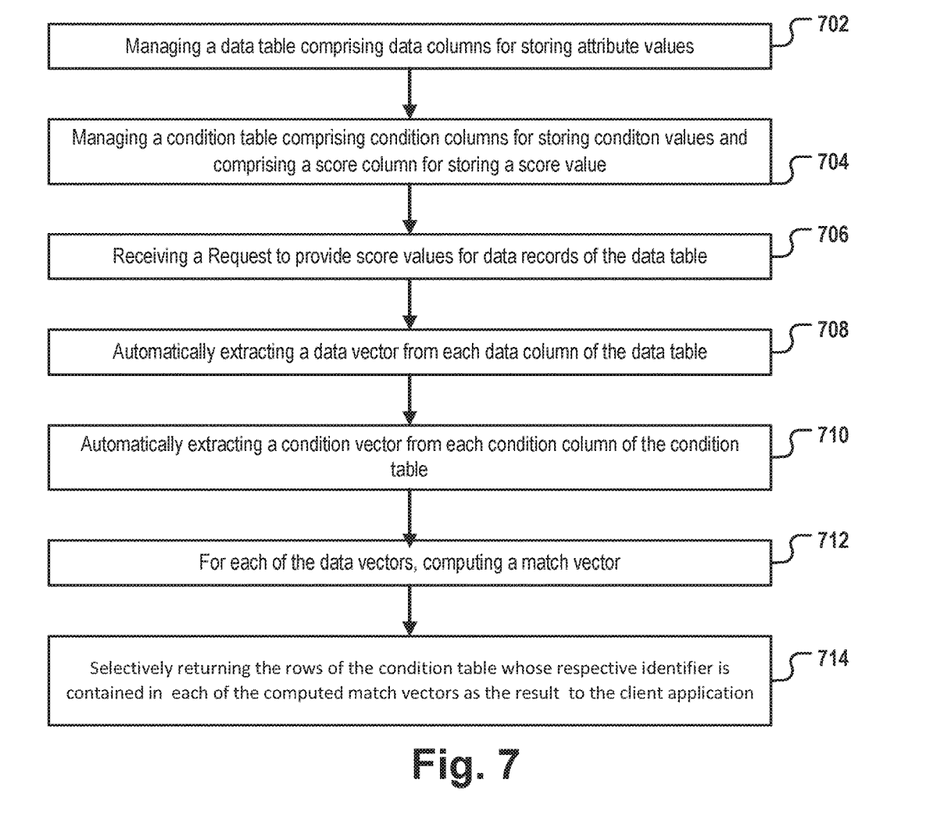
FIG. 7 depicts a flowchart of a method according to embodiments of the invention.

For example, the DBMS may receive in a step 706 a request R from the client application 128. The request may be or may trigger a call of the stored procedure 134. The stored procedure may automatically extract, from each of the data columns, a respective data vector DV1-DV6. Each data vector comprises a list of all unique attribute values contained in said data column and comprises the default value "./.".

In step 710, the DBMS automatically extracts, for each of the condition columns, a respective condition vector CV1-CV6. This process is depicted in FIG. 5b. According to some embodiments, the extraction step is also performed by the called stored procedure in response to being called.

In other embodiments, steps 706 and/or 708 are performed by the DBMS automatically by a DBMS-internal dictionary encoding process. For example, the DBMS may be a DBMS that automatically extracts a unique value list from each table column and stores the resulting vector of unique values in the dictionary of the table. The condition vector and/or the data vector may be stored in a column store 508 of the DBMS. In this case, the data vector extraction and/or the condition vector extraction may be performed when a respective table is created or modified and thus, independent of the receiving of a request R. In case only a sub-set of the data records of a data table shall be processed in response to a request, the extraction of the data vectors is typically implemented explicitly in the stored procedure. In case the whole content of a data table is to be processed for enabling score assignment, it is possible and preferable to use existing data vectors contained already in the dictionary automatically created by the DBMS for each table in the database, including the data table.

According to embodiments, each condition vector and/or each data vector is stored in a column-store format. Each condition vector comprises all unique condition values contained in the condition column and comprising the default value ("./.").

In step 712, the DBMS computes, for each of the data vectors, a match vector MV1-MV6 by computing an intersection IN1-IN6 of said data vector and the one of the condition vectors having been extracted from the condition column assigned to the data column used for extracting said data vector. In preferred embodiments, the intersection sets 510 (IN1-IN6) depicted in FIG. 5c are not explicitly calculated and stored, but may rather be computed inherently by executing an SQL command that combines a data vector and a respective condition vector for directly computing the match vector. For example, an intersection set IN1 comprises attribute values "1" and "3" which are the intersection of the data vector DV1 having attribute values "1" and "3" and the condition vector CA1 having condition values "1", "2" and "3". The match vector MV1 comprises the row-IDs "1", "3", "4", "6", "7" and "9" of all condition table rows whose condition value is identical to a value of the respective intersection set IN1, i.e., is identical to "1" or "3". The match vector MV2 is computed analogously from data vectors DV2, condition vector CA2 via intersection set IN2. Thus, each match vector is a vector comprising, for a particular column or attribute, e.g. A1, all row-IDs of all rows of a condition table whose condition value is identical to a value contained in a particular intersection set, e.g. IN1, whereby said intersection set is explicitly or implicitly computed as an intersection of a data vector DV1 extracted from a corresponding column A1 of a data table and a condition vector CV1 extracted from a corresponding column CA1 of the condition table.

For example, after having computed the intersection set IN1, the match vector MV1 can be computed explicitly using an SQL command like "SELECT row_id FROM conditiontable WHERE CA1 IN (1; 3; "%")". Thereby, the values (1; 3; "%") correspond to the values of the intersection set IN1.

The condition table 408 may comprise a column 511 comprising a unique identifier for each row of the condition table. Each match vector MV1, MV2, . . . , MV6 is generated by computing—explicitly or implicitly—an intersection IN1, IN2, . . . , IN6 of one of the data vectors DV1, DV2, . . . , DV6 and one of the condition vectors CV1, CV2, . . . , CV6 whose condition column is assigned to the data column from which said data vector was extracted. Then, in a further explicit or implicit computational operation, for each Attribute (e.g. A1), all row-IDs 511 of the condition table are identified whose condition value in the corresponding column CA1 matches a value in the in intersection set IN1. Thus, each match vector MV1, . . . , MV6 selectively comprises identifiers of the rows 511 in the condition table 408 whose condition value is contained in said condition vector and whose condition value is identical to an attribute value of said data vector. Said identifiers can be quickly identified via DBMS-internal, speed-optimized routines for computing intersections of data vectors.

In step 714, the DBMS (e.g., the stored procedure contained in the DBMS and being called by the request R) selectively returns the rows of the condition table whose respective identifier is contained in each of the computed match vectors as the result 502 to the client application. Thereby, the DBMS enables the client application to identify assignments of the data records and the score values in the condition table by processing the result.

According to embodiments, at least the condition table rows returned to the client application, but optionally all condition table rows, comprise a first code value in a pattern column 412. Depending on the embodiment, the first code value is computed by the stored procedure in response to the request R or the condition table may already comprise the first code values from the beginning, i.e., since the moment of creating the condition table in the database. Each first code value comprises as many code positions as there exist condition columns in the condition table and comprises, at each of its positions, the condition value of the respective condition column of said row or a derivative of said condition value, e.g. a hash value, a chunk value, a "toLower-CaseString" version of a condition value or the like.

FIG. 5d depicts match vectors respectively comprising IDs of condition table rows whose condition values are all contained in a respective intersection set of FIG. 5c. The match vectors are used for identifying a subset of condition table rows having a row identifier being contained in each of the computed match vectors.

For example, the match vectors can be obtained by the following SQL statement:
"SELECT * from conditiontable where
CA1 in (SELECT distinct A1 from datatable) OR CA1 is 'default_value') AND
CA2 in (SELECT distinct A2 from datatable) OR CA2 is 'default_value') AND
CA3 in (SELECT distinct A3 from datatable) OR CA3 is 'default_value') AND
CA4 in (SELECT distinct A4 from datatable) OR CA4 is 'default_value') AND
CA5 in (SELECT distinct A5 from datatable) OR CA5 is 'default_value') AND
CA6 in (SELECT distinct A6 from datatable) OR CA6 is 'default_value').

In this example, the "SELECT distinct A* from datatable" generates the respective data vectors. The condition vectors may implicitly be provided by the DBMS in a column encoding process as part of the database dictionary. The expression "CAX in (SELECT distinct AX from datatable)" may cause the query planner to automatically use the already existing condition vector for condition column CAX for implicitly computing an intersection condition vector CAX and the data vector generated in the "SELECT distinct" clause for data column AX. The individual, column-specific sub-statements "CAX in (SELECT distinct AX from datatable) OR CAX is 'default_value')" of each of the condition columns are connected via an AND operator. The above given example of a SELECT query will identify, in a single query, all condition columns which are to be returned to the client application as a result.

It should be noted that the returned condition table rows will comprise all condition table rows that could potentially fulfill the requirement that each of its condition values either matches with an attribute value of at least one data record or is a default value. However, it is possible that a returned condition table row does not fulfill said criterion, because the identification of the condition table rows via the match vectors can only ensure that each condition value matches at least one data value of its respective data vector. There is no guarantee that the respectively matching attribute values were derived from same data record. Thus, the returned condition table rows may comprise some rows whose score value will not be assigned to any one of the data records 130 by the client application. However, the number of such "superfluous" condition table rows is typically small. Moreover, the client application, by comparing the first and second code values, can easily filter out such "superfluous" condition table rows.

According to embodiments, each of the condition-column-CAX-specific SQL clauses "where CAX in (SELECT distinct AX from datatable) OR CAX is 'default_value')" is executed on a respective processor or processor core concurrently to corresponding SQL clauses directed at other ones of the condition columns.

Figure 6:
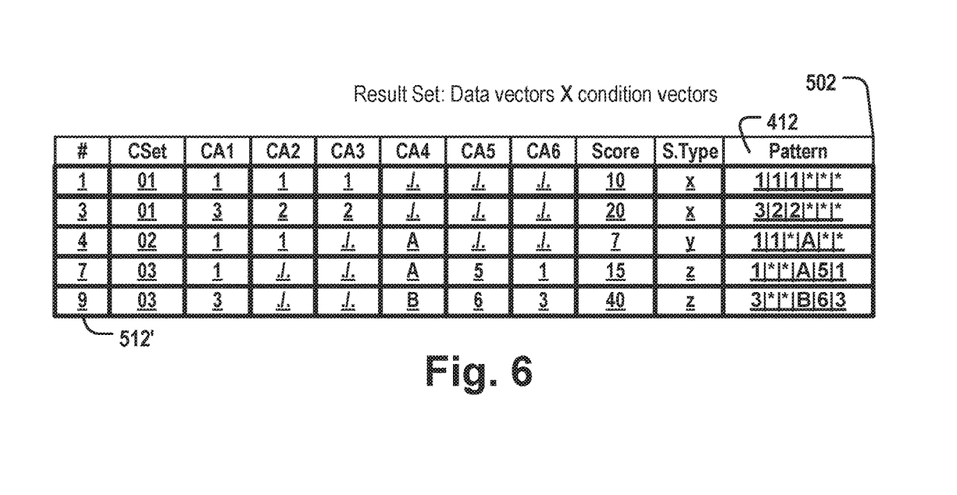
FIG. 6 depicts a subset of condition table rows returned as a result to a client application.

FIG. 6 depicts said subset of condition table rows returned to the client application. The identified subset of condition table rows is returned (e.g. by the stored procedure) in step 714 as a result 502 to the client application in response to the request R. The returned result may in some embodiments in addition comprise some or all data records of the data table to which the score values shall be assigned. For example, said data records may be selected by means of SELECT WHERE clauses specified in the request R.

The returned result enables the client application to identify assignments of the data records and the score values in the condition table by processing the result.

The identification of one or more condition table rows in the returned result that match with a particular data object 130 (or data record) is performed, according to embodiments of the invention, very efficiently by creating a search index on the pattern 412 column of the returned condition table rows and sequentially scanning the data objects 130 for identifying, for each data record, one or more returned condition table rows having a first code value that is identical to the second code value of said data record. Thereby, the index may be used for increasing the speed. Said index creation and sequential scanning of the data records 130 can be performed by the client application.

According to some embodiments, the client application calculates, for each of the data objects 130 managed by the client application, an aggregate score value from all score values having been assigned to said data record by comparing the first and second code values and assigning a score value of a returned condition table row to one of the data records 130 selectively in case the first code value of the condition table row containing said score value is identical to the second code value of said data record. The code value aggregation may comprise summing up all assigned score values. It may also involve more complex computations, e.g. a combination of multiplications, summarizations etc. For example, a final price value could be computed by adding transportation costs, material costs as absolute values in a given currency and by multiplying the resulting intermediate score value with a tax rate and a discount rate, the tax rate and the discount rate also being score values assigned to said data record. Thus, a plurality of different—absolute as well as relative—score values assigned to a particular data record may be aggregated to a final, aggregated score value.

Performance Improvements—Examples

In the following various improvements in respect to processing speed and resource consumption provided by embodiments of the invention compared to prior-art system will be provided.

By unifying multiple condition set tables 402, 404, 406 into a single condition table 408 and using said condition table instead of the multiple condition set tables results in a decrease of memory consumption when evaluating the conditions for checking if the score value of a condition table/condition set table shall be assigned to a data record or not.

According to one example, each column of the condition set tables 402-406 and the condition table 408 of FIG. 4*d* have the following data type and respective size (assuming no NULL values):
Column Cond.Set.Type 410: char(2) (2 byte)
Columns CA1 CA2, CA3, CA5, CA6: integer (4 byte)
Column CA4: char(1) (1 byte)
Column Score: char(8) (8 byte)
Column Score Type char(1) (1 byte)
Column Pattern: string (2 byte compressed/encoded)

| Table | Size of each row |
|---|---|
| Table 402 | 3 × 4 Byte + 8 Byte + 1 Byte = 21 Byte |
| Table 404 | 2 × 4 Byte + 1 Byte + 8 Byte + 1 Byte = 18 Byte |
| Table 406 | 3 × 4 Byte + 1 Byte + 8 Byte + 1 Byte = 22 Byte |
| Table 408 | 2 Byte + 5 × 4 Byte + 1 Byte + 8 Byte + 1 Byte + 2 Byte = 34 Byte |

When storing data values in a table column in a respective unique value vector, e.g. in a columnar data structure, each value is stored only once. This single value may be linked via pointers to one or more table rows. The memory footprint (main memory allocation in columnar store) of the respective condition set tables 402-406 and the condition table 408 is as follows.

TABLE 402

| | Memory consumption |
|---|---|
| CA1 | 3 * 4 Byte = 12 Byte |
| CA2 | 2 * 4 Byte = 8 Byte |
| CA3 | 2 * 4 Byte = 8 Byte |
| Score | 3 * 8 Byte = 24 Byte |
| Score Type | 1 * 1 Byte = 1 Byte |
| TOTAL: | 53 Bytes |

TABLE 404

| | Memory consumption |
|---|---|
| CA1 | 3 * 4 Byte = 12 Byte |
| CA2 | 2 * 4 Byte = 8 Byte |
| CA4 | 3 * 1 Byte = 3 Byte |
| Score | 3 * 8 Byte = 24 Byte |
| Score Type | 1 * 1 Byte = 1 Byte |
| TOTAL: | 48 Bytes |

TABLE 406

| | Memory consumption |
|---|---|
| CA1 | 3 * 4 Byte = 12 Byte* |
| CA4 | 2 * 1 Byte = 2 Byte |
| CA5 | 2 * 4 Byte = 8 Byte |
| CA6 | 2 * 4 Byte = 8 Byte** |
| Score | 3 * 8 Byte = 24 Byte |
| Score Type | 1 * 1 Byte = 1 Byte |
| TOTAL: | 55 Bytes |

*) For CA1 there exist 3 distinct values ("1", "2" and "3") contributing 4 Byte, respectively
**) For CA6 there exist 2 distinct values ("1" and "3") contributing 4 Byte, respectively
For all three condition set tables 402, 404, 406, this totals to 156 Bytes.

TABLE 408

| | Memory consumption |
|---|---|
| Cond.Set.Type 410 | 3 * 2 Byte = 6 Byte |
| CA1 | 3 * 4 Byte = 12 Byte |
| CA2 | 2 * 4 Byte = 8 Byte |
| CA3 | 2 * 4 Byte = 8 Byte |
| CA4 | 3 * 1 Byte = 3 Byte |
| CA5 | 2 * 4 Byte = 8 Byte |
| CA6 | 2 * 4 Byte = 8 Byte |
| Score | 8 * 8 Byte = 64 Byte* |
| Score Type | 3 * 1 Byte = 3 Byte** |
| Pattern | 9 * 2 Byte = 18 Byte*** |
| TOTAL: | 138 Byte (Null values don't count towards total memory allocation) |

*Within the condition table, there exist 8 distinct values for the "score" contributing 8 Byte, respectively.
**Within the condition table, there exist 3 distinct values for the "score type" (x, y and z) contributing 1 Byte, respectively.
***Within the condition table, there exist 9 distinct values for the "pattern" (typically, there exist as many patterns as rows) contributing 2 Bytes, respectively.

By storing the condition values in a unified condition table using a column store format, the total memory consumption can be reduced in this example from 156 Byte to 138 Byte. This amounts to about 12% reduction of memory allocation. The effect is even higher for larger table with many redundant data values.

Data Traffic

According to the example embodiment depicted in FIGS. 2 and 3, five data records (or data tables) respectively corresponding to a row in data table 114 or corresponding to one of the data objects in object list 130 shall be processed. Each data object may represent an order item, so there exist 5 order items to be processed for assigning one or more score values to each order item.

In case the condition values to be evaluated for performing score assignment are scattered among the three condition set tables 402-406, the following data traffic between the DBMS and a client application would be necessary for transferring the relevant condition values to the client:

Look up in all 3 condition-set-tables:

| #data record/ order item | Retrieved bytes per table when accessed for a particular order item | Retrieved bytes | Retrieved rows of tables 402-406 |
|---|---|---|---|
| 1 | T-402: 21 Byte + T-404: 18 Byte + T-406: 22 Byte | 61 | 3 |
| 2 | T-402: 21 Byte + T-404: 18 Byte + T-406: 22 Byte | 61 | 3 |
| 3 | T-402: 21 Byte + T-404: 0 Byte + T-406: 22 Byte | 43 | 2 |
| 4 | T-402: 21 Byte + T-404: 0 Byte + T-406: 0 Byte | 21 | 1 |
| 5 | T-402: 21 Byte + T-404: 18 Byte + T-406: 22 Byte | 61 | 3 |

Thus, in case the condition values are scattered over three condition set tables 402-406, the retrieval of all condition values for all five order items from said three condition set tables involves the transfer of 247 Bytes to the client application as the transferred data volume corresponds to the sum of the retrieved bytes of all the records of the respective condition type set tables: 61 Byte+61 Byte+43 Byte+21 Byte+61 Byte=247 Byte. Thereby, 12 table rows are returned and 15 SQL statements need to be executed by the DBMS. A parallelization of threads is only possible on the basis of individual SQL commands.

By storing the condition values in a unified condition table, the data traffic and the number of SQL statements to be executed can be reduced. In particular, it is possible to parallelize data processing operations on a per-condition-column and/or a per-data column basis. Moreover, the relevant condition values for all data items can be retrieved from the database in a single SQL command. In response to the request R, the stored procedure computes a set of match vectors 512.

All (here: six) condition columns CA1-CA6 are scanned in parallel on multiple different processors or processor cores for identifying condition table rows whose condition values are either the default value or are contained in a respective one of the match vectors. This may lead to a significant reduction in execution run-time (time spend from start of execution till end of execution for a SQL request).

It should be noted that in case multiple order items match with the same condition table row, said condition table row is transferred only once. Thus, there is a significant reduction in network traffic compared to a situation where the condition values are spread over multiple tables. Instead of 247 Bytes, only 5 condition table rows corresponding to 5*34 Bytes=170 Bytes are returned to the client application according to embodiments of the invention. Only a single SELECT SQL request is performed. Thus, in the described example, there is a reduction in network traffic of (247−170)/247=31%.

Query Execution Time

Embodiments of the invention may allow identifying all relevant condition table lines in a single SQL query. Thus, it is not necessary any more to perform multiple SQL statements (number of statement=number of items*number of condition set tables to be accessed) on different condition-set-tables that can be parallelized only on a per-query basis which produces a significant computational overhead due to an increased query handling workload. Embodiments of the invention require reduced CPU consumption for the DB engine. In the depicted example, the retrieval of all relevant condition table rows from a unified condition table reduced the processing time by 55% compared to approaches using multiple condition-set tables.

The table below lists end-to-end run-times for the use-case relating to the use of a single condition table 408 rather than multiple condition set tables 402-406:

| | Items to be priced (customer x materials) | | | |
|---|---|---|---|---|
| | 10 × 100 | 100 × 100 | 300 × 100 | 1 × 100 |
| Acceleration factor | 2.6 | 4.2 | 4.5 | 0.95 |
| Run time unified condition table 408 | 1.822 msec | 10.334 msec | 28.631 msec | 1.076 msec |
| Run time three condition set tables 402-406 | 4.736 msec | 43.129 msec | 127.726 msec | 1.020 msec |

The invention claimed is:

1. A computer-implemented method for returning, in response to a request of a client application to a database management system (DBMS), a result, the DBMS comprising a database, the database comprising:

a data table comprising a plurality of data records and comprising a plurality of data columns, each data column representing an attribute; and a condition table comprising a plurality of condition columns and a score column, each of the plurality of condition columns being assigned to one of the plurality of data columns and comprising a plurality of condition values, each row of a plurality of rows in the condition table comprising one score value, the method comprising:
receiving, by the DBMS, the request,
automatically extracting, by the DBMS, from each of the plurality of data columns, a data vector of a plurality of data vectors,
automatically extracting, by the DBMS, from each of the plurality of condition columns, a condition vector of a plurality of condition vectors,
for each respective data vector among the plurality of data vectors, computing, by the DBMS, a match vector by computing an intersection of said respective data vector and a corresponding condition vector among the plurality of condition vectors to generate a plurality of match vectors, the corresponding condition vector having been extracted from a condition column among the plurality of condition columns assigned to a data column among the plurality of data columns used for extracting said respective data vector, the match vector selectively comprising identifiers of the plurality of rows in the condition table whose condition value is identical to an attribute value of said respective data vector, and
selectively returning, by the DBMS, matching rows among the plurality of rows in the condition table whose respective identifier is contained in each of the plurality of match vectors as the result to the client application.

2. The computer-implemented method of claim 1, the method further comprising:
performing, by the client application, the identification of the assignments of the plurality of data records to the one or more score values contained in the condition tables by, performing, for each of the data records:
a) for each row of the result, checking if all condition column cells of said row comprise a condition value or a default value that is identical to a corresponding attribute value of the data record;
b) only in case said checking returns TRUE for a row in the result, assigning the score value of said row of the result to said data record.

3. The computer-implemented method of claim 2, the method further comprising:
c) computing, by the client application for each of the plurality of data records, an aggregated score value from all score values having been assigned to said data record in b); and
d) assigning the aggregated score value to the data record.

4. The computer-implemented method of claim 1, wherein each data record represents a data object of a data object type,
wherein the plurality of data columns of the data table represent an attribute value of said data object type;
wherein each of the plurality of condition values is a data value that is to be compared with attribute values in corresponding data columns among the plurality of data columns;
wherein each of the plurality of condition columns represents a condition type;

wherein each data vector of the plurality of data vectors comprises a list of all unique attribute values contained in a corresponding data column among the plurality of data columns and comprises a default value;

wherein each condition vector of the plurality of condition vectors comprises all unique condition values contained in a corresponding condition column among the plurality of condition columns and comprises the default value; and wherein the result is returned to the client application for enabling the client application to identify assignments of the data records and the score values in the condition table by processing the result.

5. The computer-implemented method of claim 1, the result comprising a pattern column, the method further comprising:

computing, for each respective row of the plurality of rows, a first code value, the first code value comprising a plurality of code positions, there existing as many code positions in the plurality of code positions as there exist condition columns in the plurality of condition columns and comprising, at each respective code position among the plurality of code positions, a respective condition value among the plurality of condition values of a respective condition column among the plurality of condition columns of said respective row or a derivative of said respective condition value; and storing the first code value of each row of the plurality of rows in a respective cell of the pattern column.

6. The computer-implemented method of claim 5, the method further comprising:

computing, by the client application, for each respective data record of the plurality of data records, a second code value, the second code value comprising the plurality of code positions and comprising, at each respective code position of the plurality of code positions, a particular attribute value of a corresponding data column among the plurality of data columns of said respective data record or a derivative of said particular attribute value, the corresponding data column being assigned to a condition column among the plurality of condition columns to which said respective code position corresponds; and performing the checking by determining if the second code value of said data record matches with the first code value of each of said identified rows in the condition table, whereby a second code value matches with a first code value in case for each particular code position among the plurality of code positions the following criteria are fulfilled:
i) the second code value comprises, at said particular code position, a same data value as the first code value at said particular code position; or
ii) the particular code position of the first code value comprises the default value.

7. The computer-implemented method of claim 1, the DBMS being hosted on a multi-processor computer system, the method being performed by the DBMS on multiple processors, the extraction of the plurality of data vectors from each of the plurality of data columns being performed for different data vectors among the plurality of data vectors in parallel.

8. The computer-implemented method of claim 1, the DBMS being hosted on a multi-processor computer system, the method being performed by the DBMS on multiple processors, the extraction of the plurality of condition vectors from each of the plurality of condition columns being performed for different condition vectors among the plurality of condition vectors in parallel.

9. The computer-implemented method of claim 1,
at least one of the plurality of condition vectors, the plurality of data vectors or the plurality of match vectors respectively being stored in a column store data format; or
at least one of the plurality of condition vectors or the plurality of data vectors respectively being created by a column store module of the DBMS.

10. The computer-implemented method of claim 1, the plurality of condition vectors being created automatically upon creating or updating the condition table in the database.

11. The computer-implemented method of claim 1, the client application being one of:
an application hosted on a client device operatively coupled to the DBMS via a network;
an application program running on the same computer system as the DBMS;
a plug-in of the DBMS.

12. The computer-implemented method of claim 1, further comprising:
using, by the DBMS, the condition table instead of a plurality of condition-set-tables for increasing the performance of the score computation, each condition-set-table comprising a set of condition columns and representing a set of condition types, the set of condition types being completely or partially disjoint from the sets of condition types represented by condition columns of other ones of the condition-set-tables, each condition-set-table comprising a score column.

13. The computer-implemented method of claim 12, further comprising creating the condition table from the plurality of condition-set-tables by:
Identifying a non-redundant set of all condition types represented by all condition columns of all condition-set-tables in the database;
Creating the condition table as a table comprising, for each of the identified condition types, a respective condition column, the condition table further comprising a score column;
for each of the condition-set-tables: copying each row of said condition-set-table to a respective row in the condition table, whereby cells in the condition table belonging to condition columns not corresponding to a respective condition column in said condition-set-table are filled with the default value and whereby the cell in the condition table belonging to the score column is filled with the score value of said row in said condition-set-table.

14. The computer-implemented method of claim 12, the using of the condition table instead of the plurality of condition-set-tables comprising at least one of:
replacing, by the DBMS in the database, a plurality of condition-set-tables by the condition table;
or supplementing, by the DBMS, the database comprising a plurality of condition-set-tables with the condition table;
or executing a stored procedure configured to compute the plurality of data vectors and the result in a single condition table access operation instead of iteratively, in two or more nested score computation loops, accessing a condition-set-table access for identifying a score value to be assigned to a particular data record.

15. The computer-implemented method of claim 1, the DBMS running on a computer system coupled to a client system via a network connection, the request being submitted by an application program running on the client system via the network to the DBMS, the data records and their assigned score values being returned to the client system via the network.

16. The computer-implemented method of claim 1, wherein at least one of:

the extraction of the plurality of data vectors, the computation of the plurality of match vectors and the returning the result is implemented in a stored procedure stored in the database and invoked upon the DBMS receiving the request; or the computation of the first code values is implemented in a stored procedure, and the stored procedure is stored in the database and invoked upon the DBMS receiving the request.

17. A computer-readable storage medium comprising computer-interpretable instructions which, when executed by one or more processors of a computer system cause the computer system, alone or in interaction with a client device, to perform a method comprising:

receiving, by a database management system (DBMS), a request of a client application;

automatically extracting, by the DBMS, from each of a plurality of data columns in a data table comprising a plurality of data records, a data vector of a plurality of data vectors, each data column representing an attribute;

automatically extracting, by the DBMS, from each of a plurality of condition columns in a condition table comprising a score column, a condition vector of a plurality of condition vectors, each of the plurality of condition columns being assigned to one of the plurality of data columns and comprising a plurality of condition values, each row of a plurality of rows in the condition table comprising one score value;

for each respective data vector among the plurality of data vectors, computing, by the DBMS, a match vector by computing an intersection of said respective data vector and a corresponding condition vector among the plurality of condition vectors to generate a plurality of match vectors, the corresponding condition vector having been extracted from a condition column among the plurality of condition columns assigned to a data column among the plurality of data columns used for extracting said respective data vector, the match vector selectively comprising identifiers of the plurality of rows in the condition table whose condition value is identical to an attribute value of said respective data vector; and selectively returning, by the DBMS, matching rows among the plurality of rows in the condition table whose respective identifier is contained in each of the plurality of match vectors as the result to the client application.

18. A computer system comprising a server system, the server system comprising one or more processors, main memory and a database management system (DBMS) comprising a database, the DBMS being configured for returning, in response to a request of a client application to a DBMS, a result, the database comprising:

a data table comprising a plurality of data records, the data table comprising a plurality of data columns respectively representing an attribute; and a condition table comprising a plurality of condition columns and a score column, each of the plurality of condition columns being assigned to one of the plurality of data columns and comprising a plurality of condition values, each row of a plurality of rows in the condition table comprising one score value;

the DBMS being configured for:

receiving the request of the client application;

automatically extracting, from each of the plurality of data columns, a data vector of a plurality of data vectors;

automatically extracting, from each of the plurality of condition columns, a condition vector of a plurality of condition vectors;

for each respective data vector among the plurality of data vectors, computing a match vector by computing an intersection of said respective data vector and a corresponding condition vector among the plurality of condition vectors to generate a plurality of match vectors, the corresponding condition vector having been extracted from a condition column among the plurality of condition columns assigned to a data column among the plurality of data columns used for extracting said respective data vector, the match vector selectively comprising identifiers of the plurality of rows in the condition table whose condition value is identical to an attribute value of said respective data vector; and selectively returning matching rows among the plurality of rows in the condition table whose respective identifier is contained in each of the plurality of match vectors as the result to the client application.

19. The computer system of claim 18, further comprising a client device hosting the client application, the client device being operatively coupled to the server computer via a network.

20. The computer system of claim 18, the client device being a mobile, battery-powered telecommunication device.

* * * * *